Dec. 27, 1960
C. B. REECE
2,966,169
COMBINED INSULATION TRIM AND DAMPER
POSITIONING MEANS FOR DUCTS
Filed June 19, 1958
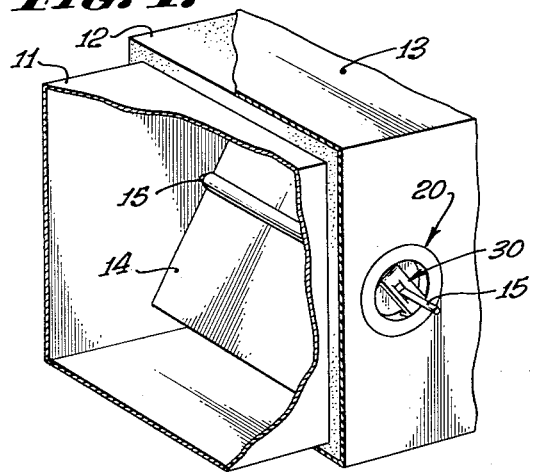
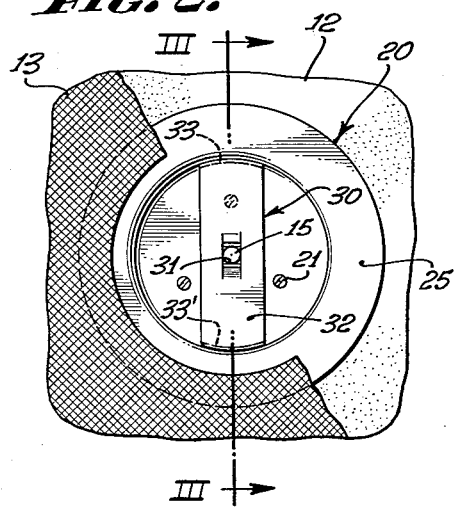
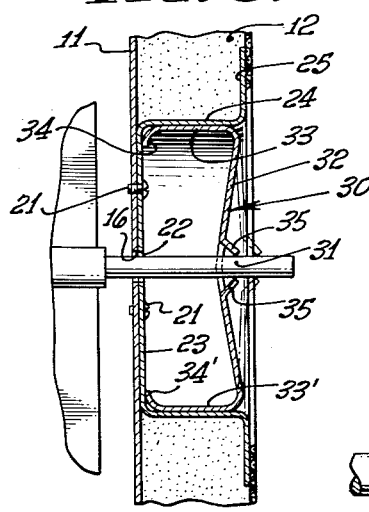
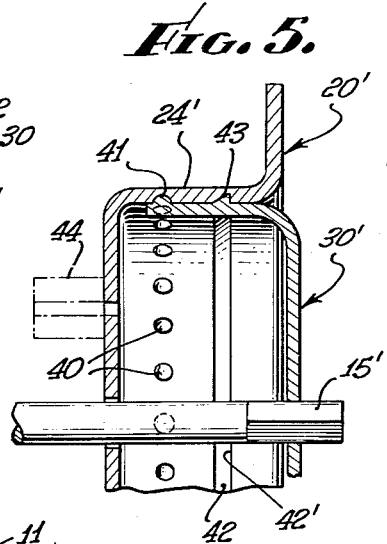
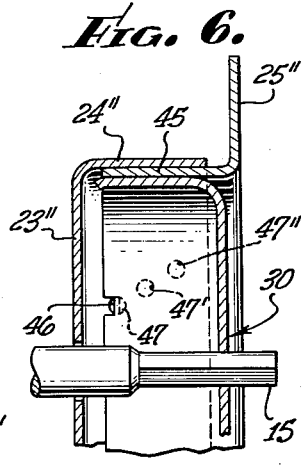
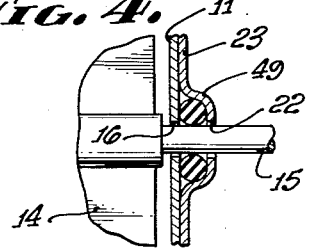
INVENTOR.
CLARK B. REECE
BY
Miketta and Glenny
ATTORNEYS.

United States Patent Office 2,966,169
Patented Dec. 27, 1960

2,966,169

COMBINED INSULATION TRIM AND DAMPER POSITIONING MEANS FOR DUCTS

Clark B. Reece, 1246 E. Calaveras, Altadena, Calif.

Filed June 19, 1958, Ser. No. 743,122

13 Claims. (Cl. 137—375)

This invention relates to adjustable flow control dampers within gas-carrying sheet metal ducts. More particularly, the device permits ready adjustment and locking of such control dampers in a desired angular position and protective trim around insulation layers near the shafts of such dampers which extend through the walls of such ducts. The invention also pertains to gasket and sealing means to prevent the effusion of gases between the damper shaft and the duct wall.

Frequently, gas-carrying sheet metal ducts are part of a heating, ventilating, air-conditioning, or other system requiring control of the flow of the gas at different points in the system. This is accomplished by the installation of adjustable dampers or other adjustable valve means at various points within the system. In order to meet the system requirements, the dampers are adjusted and locked so as to produce the desired flow characteristics. Furthermore, from time to time, the requirements of the system may change and the dampers may require readjustment.

Normally the sheet metal ducts, whether positioned within a building or externally thereof are provided with external layers of insulation, generally for the purpose of preventing heat losses and sometimes for accoustical purposes. Since insulation is normally porous and absorbent, such layers of insulation are generally protected by external, weatherproof fabrics or papers. One of the probelms of the prior art was to provide a proper seal between the devices used for adjusting the ducts and the insulation in order to prevent seepage of water, condensate and the like, into the insulation.

The typical damper or other form of adjustable valve means includes a control shaft which extends through the duct wall, the inner portion of such shaft being operatively connected to a damper and the outer portion being adjustably locked in a desired angular position to control the position of the damper. Typical prior devices consisted of fabricated metal elements including a crank arm fixed to the control shaft and means for fastening the crank arm to a plate or other extension of the device on the outer surface of the duct.

These prior devices occupied a relatively large space and it was difficult, if not impossible, to properly attach outer waterproofing layers around the insulation in the vicinity of these devices to preclude rain, condensate, and the like, from seeping into the insulation, and to protect the insulation from being torn by the wind, etc. In addition, the prior devices were fairly expensive because of the number of parts, and as previously indicated, they occupied an excessive amount of space on the outside of the duct, thereby reducing the effectiveness of the insulation. It is also to be remembered that the effectiveness of insulation is greatly reduced when the insulation is saturated with water, and such moisture is a frequent cause of rust or corrosion of the sheet metal ducts and parts, thereby tending to increase maintenance costs.

In applications where the duct carries a gas other than air, it is sometimes important to prevent contamination and escape of the gas to the ambient atmosphere or vice versa. In the prior art, this occurred by the effusion of the gas or air between the shaft and the port in the duct wall.

The device of the present invention constitutes a simplified, economical device for adjusting and locking a damper or other adjustable valve means and at the same time constitutes an efficient protective trim preventing the seepage of moisture into the insulation layer near the shaft. Furthermore, by a simple modification of the device, an effective packing or gasket means may be provided to prevent the escape of gases carried in the ducting.

It is an object of this invention, therefore, to disclose an improved gas duct damper or gas duct valve adjusting and locking device comprising fewer parts than in the prior art, and comprising more simple and less expensive parts than in the prior art and occupying less space than in the prior art.

A further object of the invention is to disclose and provide a more effective protective trim means near control shafts of dampers or other adjustable valve means, thereby preventing seepage of the elements or condensate into the insulation layer.

A still further object of the invention is to disclose and provide a gas-sealing means between control shafts of dampers or other adjustable valve means and the duct walls.

Another object is to disclose and provide a simple and effective device whereby the angular position of a damper may be readily changed and firmly locked in a desired position, the device containing an integral means to which external protective coverings may be readily connected.

Other objects will become apparent to those skilled in the art from the following description of an exemplary form of the invention, it being understood that numerous modifications and changes may be made. During such description, reference will be had to the appended drawings, in which:

Fig. 1 is a perspective view of the improved device in combination with gas-carrying sheet metal duct, said duct including a damper with damper-operating shaft extending through the duct walls. This view shows a transverse section of the gas duct in the vicinity of the damper with the improved lockfast and trim device installed. In this view, portions of the insulation layer and outside wrapping have been cut away to more clearly illustrate the construction.

Fig. 2 is a fragmentary side elevation on a plane perpendicular to the damper-operating shaft with the improved device installed. In this view, portions of the outside wrapper have been cut away to better illustrate the relationship of insulation of the device.

Fig. 3 is a vertical sectional view taken in the plane indicated by lines III—III of Fig. 2.

Fig. 4 is an enlarged cross-sectional view of a portion of a modified version of the improved device providing gas-seal means between the damper shaft and the duct wall.

Fig. 5 is a transverse section through a modified form of device.

Fig. 6 is a transverse section through a form of device capable of being adjusted for different thickness of insulation.

Reference is made to the drawings. The device in combination with the sheet metal duct including damper mechanism consists of the following combinations of elements: the gas-carrying duct having a sheet metal duct wall 11, an insulation layer 12, and an outer weatherproofing wrapper or covering 13; a gas-flow control means consisting of a damper 14 or other adjustable valve means and damper or valve operating shaft 15; and an improved lockfast and trimming device consisting of a substantially circular attachment element generally indicated at 20, and a lockfast element generally indicated at 30.

The attachment element 20 is fastened to the sheet metal duct wall 11 by common sheet metal screws 21 or other fastening means and is so positioned that the damper-operating shaft 15 extends through a port 16 in the sheet metal duct wall and a port 22 in the back wall 23 of the attachment element 20. When the attachment element is installed in combination with the sheet metal duct wall 11, insulation layer 12, and weather-proofing wrapper 13, the cylindrical wall or spacer wall portion 24 and the outwardly extending frontal lip 25 of the attachment element 20 provide a protective trim around the insulation layer 12.

The cylindrical or spacer wall portion spaces the lip 25 into a plane parallel to but spaced from the plane of the back wall 23 a distance substantially equivalent to the thickness of the insulation used, whereby the lip 25 overlies and protects the insulation by the imperforate wall and lip. The height of this spacer wall portion may be varied in accordance with the thickness of the insulation. The outwardly extending lip 25 may slightly compress the insulation and furnishes a rigid edging, to which the external layer of waterproof fabric, building paper or other protective layer may be firmly cemented, as by means of adhesives, glue, resin or the like.

The angular position of the damper 14 and damper shaft 15 about the damper shaft axis is locked by a U-shaped metal constituting the lockfast element 30, which said element is pushed inwardly upon the damper shaft 15, with the damper shaft 15 extending through a central aperture generally indicated at 31 and which said element is further inserted into the attachment element 20 so that the outer or end portions 33 and 33', which are resiliently, outwardly biased, frictionally engage the cylindrical wall or spacer portion 24 of the attachment element 20, and the inwardly directed inner lip portions 34 and 34' abut the back wall portion 23 of the attachment element 20.

In a preferred form of this device, the lockfast element 30 contains a means of firmly grasping the damper shaft 15 wherein there is a tight fit as said element is pushed inwardly upon the damper shaft 15 and wherein the metal of the strip constituting the lockfast element 30 may be lanced to provide two or more gripping and wedging teeth 35 whose edges grasp the shaft 15.

In order to adjust the damper (14) position to any angular position about the rotational axis of damper shaft 15, said damper position is prefixed and is locked in said position by pushing the lockfast element 30 inwardly upon the damper shaft until the lockfast element assumes the cross-profile shown by the unbroken lines in Fig. 3. Before such locking action, the central member 32 of the U-shaped lockfast element 30 exhibits a convex cross-profile as shown by the dotted lines. After said installation, the central member 32 exhibits a concave, cross-profile as shown by the unbroken lines in Fig. 3 and the gripping and wedging teeth 35 develop an angle of clearance with respect to the longitudinal axis of the damper shaft 15. Furthermore, the gripping teeth 35 macroscopically bite into the surface of the damper shaft 15. In such locked position, the damper shaft 14 is firmly grasped by the above-mentioned grasping means and end portions 33 and 33' of the lockfast element 30 are resiliently outwardly biased so as to firmly frictionally engage the cylindrical wall or spacer wall portion 24 of the attachment element 20, thereby locking the angular position of the damper shaft 15 about its radial axis.

It will be noted that the locking strip or lockfast element extends transversely of the cylindrical recess of the attachment and is protected by the side walls of the recess but accessible for adjustment.

Readjustment of the damper position can be effected by prying the lockfast element 30 outwardly from its locked position and thereby releasing its end portions 33 and 33' from frictional engagement with the attachment element 20 and releasing the damper shaft 15 from the aforesaid grasping means. The position of damper may then be adjusted as required and the lockfast element 30 again pushed inwardly upon the damper shaft 15 into the locked position. If the lockfast element 30 is rendered unuseable by the prying action, it may be replaced, the cost of such replacement being negligible.

In one possible modified version of the device the end portions 33 and 33' of the lockfast element 30 and for the inner surface of wall 24 may be roughened or serrated so as to provide more efficient frictional engagement with the spacer wall portion 24 of the attachment element 20.

In another possible modified version of the device, the significant portion of which is illustrated in Fig. 4, an annular recess is formed around the port 22 in the back wall portion 23 of the attachment element 20 and a gasket or O-ring 49 is placed in said annular recess to provide a seal and packing means between the damper shaft 15 and the sheet metal duct wall 11.

The devices contemplated by this invention may be made of any suitable metal or they may be made of plastic or plastic moldable compositions of adequate strength and weather resistance. Fig. 5 illustrates a modification wherein the attachment element 20' is made of plastic, the cyilndrical spacer wall portion 24' is provided with a series of recesses, indentations or grooves such as the semi-spherical recesses 40; the transversely extending resilient lockfast element 30' is provided with outwardly extending beads or bosses such as 41 formed in the outer surface of the end portions 33', these beads or bosses 41 cooperating with the recesses 40 so as to lock the element 30' in a desired angular position. In addition, the inner surface of the spacer wall 24' may be formed with a circumferential groove 42 having a stop shoulder 42'. The outer surface of the outwardly biased end portions 33' of the lockfast element may be provided with substantially triangular, outwardly extending ring 43 adapted to enter the groove 42. This ring and groove cooperate to resist outward motion of the lockfast element without greatly interfering with the ease with which the lockfast element may be inserted. It may be also noted that the shaft 15' is provided with a squared end cooperating with an opening of similar contour in the lockfast element 30' so as to prevent rotation between the lockfast element and the shaft.

In order to space the lip 25' a suitable distance from the outer surface of the duct, the entire attachment element shown in Fig. 5 may be made for use with the minimum amount or thickness of insulation, and when greater thicknesses of insulation are used, short spacer elements or cylindrical sections 44 may be introduced between the back wall 23' and the outer surface of the duct, the attachment screws passing through these hollow spacer elements 44.

Insulation may vary in thickness from about one inch to two inches in different installations, and although the arrangement illustrated in Fig. 5 permits great flexibility, a telescopic device of the character illustrated in Fig. 6 may also be used. As there illustrated, the back wall 23" is integral with the cylindrical wall portion 24", but the lip 25" is integral with a cylindrical portion 45 adapted to slidably telescope within the cylindrical portion 24". The spacing of lip 25" with respect to the plane of the back wall 23" can be readily adjusted as by means of a pin or rivet carried by one cylindrical wall and selectively insertable into spaced ports in the other wall. In Fig. 6, the inner edge of the cylindrical wall 45 is shown lanced and bent outwardly to form an outwardly extending pin or lug 46 capable of being forced into a port such as 47 formed in the cylindrical wall 24". Additional ports such as 47' and 47" are formed in this outer cylindrical wall to receive the pin 46 in the event a different spacing or thickness of insulation is employed.

All changes and modifications of this invention coming within the scope of the appended claims are embraced thereby.

I claim:

1. A device for attachment to the outer wall of a gas carrying duct, said wall being covered with a layer of insulating material, the duct containing a damper having a damper-operating shaft extending through the duct wall, comprising: a substantially circular attachment element having a ported back wall adapted to be attached to a wall, cylindrical side walls forming a cylindrical recess, and a frontal outwardly extending lip in a plane spaced from the plane of the back wall; a lockfast element extending transversely across the cylindrical recessed portion and having means for selectively non-rotatably grasping a shaft extending into the recess through said ported back wall; said lockfast element being selectively movable along the axis of the cylindrical recess and being rotatable about such axis; and means carried by the lockfast element and cooperating with the attachment element for restraining the lockfast element against rotation with respect to the attachment element in any selected angular position of the lockfast element.

2. A device as stated in claim 1 wherein the last-named means includes outwardly biased resilient end portions insertable into the cylindrical recess and such end portions of said lockfast element are roughened to frictionally engage the cylindrical wall portions of the attachment element.

3. A device as stated in claim 1 wherein an annular recess is formed around the periphery of the port in the back wall, which said recess contains a gasket to seal with a shaft extending through such port.

4. A trim and lockfast device for use with ducts having walls covered with a layer of insulating material and containing damper means, and a damper-operating shaft extending through said duct wall, comprising: a substantially circular attachment element having a ported back wall through which a shaft may extend, a substantially cylindrical portion, and a frontal outwardly extending lip in a plane spaced from the plane of the back wall a distance sufficient to permit said lip to overlie a layer of insulating material; means for attaching the back wall to a duct; a U-shaped locking strip extending transversely of the cylindrical portion and having outwardly biased, resilient end portions insertible into the cylindrical portion of said attachment element for frictional engagement with diametrically opposed cylindrical portions of said attachment element; and means carried by said locking strip for engaging and grasping a shaft extending through the ported back wall of said attachment element.

5. A device as stated in claim 4 wherein the outer surfaces of the outwardly biased, resilient end portions of said locking strip are roughened to frictionally engage the cylindrical wall portions of the attachment element.

6. A device as stated in claim 4 wherein an annular recess is formed around the periphery of the port in the back wall, which said recess contains a gasket to seal with a shaft extending through such port.

7. A trim and lockfast device for use with a sheet metal duct for gases, said duct including adjustable valve means and a valve-operating shaft extending through a duct wall covered with a layer of insulating material, comprising: a substantially circular ported back wall and an integral cylindrical wall portion extending generally perpendicularly therefrom; a frontal portion comprising an outwardly extending lip and a substantially cylindrical wall portion adapted to telescopically and adjustably engage the first wall portion to selectively position said lip in a plane at a desired distance from the plane of said back wall; and an adjustably angularly positionable lockfast element extending transversely of said cylindrical wall portions to releasably grasp a shaft extending through said ported back wall to selectively hold the same against rotation with respect to said cylindrical wall portions.

8. A device as stated in claim 7 wherein one of said telescopically related wall portions is provided with pin means and the other wall portion is provided with aperture means to selectively receive said pin means and hold said wall portions in selected position.

9. A device as stated in claim 7 wherein said lockfast element is substantially U-shaped and provided with outwardly biased, resilient outer end portions insertable into said device for frictional engagement with diametrically opposed cylindrical wall portions of said frontal portion.

10. A trim and lockfast device for use with ducts having walls covered with a layer of insulating material and containing damper means, and a damper-operating shaft extending through said duct wall, comprising: a substantially circular attachment element having a ported back wall through which a shaft may extend; a substantially cylindrical portion integral with said back wall and forming a recess, and a frontal outwardly extending lip in a plane spaced from the plane of the back wall; a lockfast element extending transversely of said recess and having outwardly biased portions insertable into said recess of the attachment element at a plurality of angular positions and means for non-rotatably grasping a shaft extending through said ported back wall; and cooperating means carried by said outwardly biased portions and the cylindrical portion of the attachment element for restraining said lockfast element against rotation with respect to said attachment element in any desired angular position.

11. A device as stated in claim 10 wherein outwardly biased portions of said lockfast element include outwardly extending means for cooperation with means in the cylindrical portion for holding said lockfast element in position after it is inserted into the attachment element.

12. A trim and lockfast device comprising a substantially circular attachment element having a ported back wall adapted to be connected to a support, a substantially cylindrical portion unitary with said back wall and forming a cylindrical, open front recess, and a frontal outwardly extending annular lip in a plane spaced from the plane of the back wall; a U-shaped lockfast strip extending transversely of said recess and having end portions insertable into the recess of said attachment element with said strip at any desired angular position, and means carried by the strip for releasably grasping a shaft; and cooperating means carried by said end portions and the cylindrical portion of the attachment element for restraining said lockfast strip against rotation with respect to said attachment element.

13. A device as stated in claim 12 wherein the end portions of the strip and the cylindrical portion of the attachment element include cooperating means to restrain ready withdrawal of the end portions after said end portions have been inserted into the attachment element.

References Cited in the file of this patent

UNITED STATES PATENTS

| | | |
|---|---|---|
| 1,311,039 | Burman | July 22, 1919 |
| 2,177,370 | McDonough | Oct. 24, 1939 |
| 2,438,672 | Margrave | Mar. 30, 1948 |
| 2,511,349 | Klay | June 13, 1950 |
| 2,642,502 | Johnson | June 16, 1953 |
| 2,699,318 | Ellison et al. | Jan. 11, 1955 |
| 2,826,093 | Draper | Mar. 11, 1958 |
| 2,842,317 | Wood | July 8, 1958 |